United States Patent Office 2,949,456
Patented Aug. 16, 1960

2,949,456

CERTAIN 2-PHENYL-IMINO-3-PHENYL-THIAZOLINES

Renat Herbert Mizzoni, Long Valley, N.J., assignor to Ciba Pharmaceutical Products, Inc., Summit, N.J., a corporation of New Jersey No Drawing. Filed Nov. 28, 1958, Ser. No. 776,754

2 Claims. (Cl. 260—240)

The present invention relates to 4-lower alkylthiazolines. More particularly, the invention concerns 2-phenylimino - 3 - phenyl - 4 - lower alkyl-4-thiazolines, in which each of the phenyl radicals contains in the 4-position a group of the formula Py—$(CH=CH)_n$—, in which Py stands for a pyridyl group and $n$ for a whole number from 1 to 2, the salts thereof, as well as process for the preparation thereof.

A pyridyl radical is represented by 3-pyridyl, 4-pyridyl, or especially 2-pyridyl radicals, which radicals may contain as additional substituents lower alkyl, e.g. methyl or ethyl; nitro or amino groups, or halogen, e.g. chlorine or bromine.

Lower alkyl in the 4-position of the 4-thiozoline ring represents ethyl, or particularly methyl.

Salts of the new compounds of this invention are particularly therapeutically acceptable acid addition salts, for example, those with inorganic acids, such as hydrochloric, hydrobromic, sulfuric or phosphoric acids; or those with organic acids, such as acetic, propionic, glycolic, lactic, oxalic, malonic, maleic, fumaric, malic, benzoic, salicylic, 4-aminosalicylic, methane sulfonic, ethane sulfonic or hydroxyethane sulfonic acid. Hydrates, as well as mono- or bis-salts may be formed.

The new compounds, and salts thereof are active against different types of Mycobacteria, such as *Mycobacterium tuberculosis,* for example, the human pathogenic strain H 37 Rv of *Mycobacterium tuberculosis,* or against *Mycobacterium leprae,* and may be used as antitubercular or antileprotic agents. For example, a good tuberculostatic activity may be obtained with 2-phenyl-imino-3-phenyl-4-methyl-4-thiazoline derivatives, in which each of the phenyl radicals contains in the 4-position a 2-(2-pyridyl)-ethenyl group.

The new compounds may be used as medicaments in the form of pharmaceutical preparations, which contain the new compounds, salts thereof or mixtures of these compounds in admixture with a pharmaceutical organic or inorganic, solid or liquid carrier suitable for enteral, e.g. oral, or parenteral administration. For making up the preparations there may be employed substances which do not react with the new compounds, such as water, gelatine, lactose, starches, stearic acid, magnesium stearate, stearyl alcohol talc, vegetable oils, benzyl alcohols, gums, waxes, polyalkylene glycols or any other known carrier for medicaments. The pharmaceutical preparations may be in solid form, for example, as tablets, capsules or dragees, or in liquid form, for example, as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances, particularly other tuberculostatic reagents, such as streptomycin, dihydrostreptomycin, 4-aminosalicylic acid or isonicotinic acid hydrazide, or other leprostatic compounds, such as sulfones, e.g. thiazosulfone.

The new 4-thiazoline derivatives of this invention, and the salts of such compounds may be prepared, for example, by reacting a 1,3-diphenyl-2-thiourea, in which each of the phenyl radicals contains in the 4-position a group of the formula Py—$(CH=CH)_n$—, in which Py and $n$ have the above-given meaning, or a salt thereof with a methyl lower alkyl ketone, in which the methyl group contains a halogen atom, and, if desired, converting a resulting salt into a free base, and/or, if desired, converting a free base into a salt thereof, and/or, if desired, separating a resulting mixture into the single compounds.

Methyl lower alkyl ketones, in which the methyl group is substituted by a halogen atom, e.g. chlorine, bromine or iodine, may be represented, for example, by monochloracetone, monogromoacetone or monobromo-methyl ethyl ketone.

The reaction is preferably conducted in the presence of a solvent, for example, a lower alkanol, e.g. methanol or ethanol; and aromatic hydrocarbon, e.g. benzene or toluene; or a lower carboxylic acid in the presence of an alkali metal salt of such acid, for example, acetic acid, e.g. glacial acetic acid in the presence of sodium acetate. If desired, the reaction may be completed more rapidly by refluxing the mixture up to 6 hours. Any unreacted thiourea contaminating the final product may be identified by infra-red studies or by the formation of an insoluble black precipitate upon addition of lead acetate to an alcoholic solution of the product. If necessary, the reaction may be completed by reacting the product containing any unreacted thiourea with an additional amount of the halogenated ketone.

The starting materials used in this reaction may be prepared according to known methods for the manufacture of analogous compounds. For example, symmetrically substituted 1,3-diphenyl-2-thioureas may be prepared by reacting an appropriately substituted aniline with thiophosgene or carbon disulfide; for example, 4-[2-(2-pyridyl)-ethenyl]-aniline may be treated with carbon disulfide in the presence of potassium ethyl xanthate to form the desired 1,3-bis-{4-[2-(2-pyridyl)-ethenyl]-phenyl}-2-thiourea. Asymmetric 1,3-diphenyl-2 - thioureas may be prepared by reacting an appropriately substituted phenylisothiocyanate with a 4-substituted aniline. The thioureas may also be used in the form of their acid addition salts.

If asymmetrically substituted 1,3-diphenyl-2-thioureas are used as starting materials, the new 4-thiazoline compounds of this invention may be obtained in the form of a mixture of two isomeric compounds, which may be separated into the two single compounds by ordinary methods, such as fractionated crystallization, adsorption, etc. The mixture may also be used as such.

Depending on the conditions used the new compounds may be obtained in the form of the free bases or salts thereof. A salt may be converted into the free base in the customary way, for example, by treatment with an aqueous alkaline medium, such as an alkali metal hydroxide, e.g. sodium or potassium hydroxide; an alkali metal carbonate, e.g. sodium carbonate or potassium hydrogen carbonate; or ammonia. A free base may be transformed into its therapeutically acceptable acid addition salts by reaction with one of the acids outlined above, for example, in a lower alkanol, e.g. methanol, ethanol, propanol or isopropanol, solution. The compounds may also be obtained as the hydrates, e.g. hemihydrate, monohydrate, sesquihydrate or polyhydrate.

The following example is intended to illustrate the invention and is not to be construed as being a limitation thereon. Temperatures are given in degrees centigrade.

*Example*

A mixture of 1.8 g. of 1,3-bis-{4-[2-(2-pyridyl)-ethenyl]-phenyl}-2-thiourea and 4.9 g. of chloroacetone in 150 ml. of anhydrous ethanol is refluxed for three hours. The hot solution is filtered, chilled and then diluted with ether. The precipitate is filtered off and recrystallized twice from a mixture of ethanol and ether to yield the 2-{4-[2-(2-pyridyl)-ethenyl]-phenyl}-imino-3-{4-[2-(2-pyridyl)-ethenyl]-phenyl} - 4 - methyl-4-thiazoline hydrochloride.

The starting material may be prepared as follows: A solution of 15.7 g. of 4-[2-(2-pyridyl)-ethenyl]-aniline, 7.6 g. of carbon disulfide and 0.1 g. of potassium ethyl xanthate in 100 ml. of methanol is refluxed for two hours. A precipitate is formed after about 1½ hours, which is filtered off after cooling. The resulting 1,3-bis-{4-[2-(2-pyridyl)-ethenyl]-phenyl}-2-thiourea is recrystallized from a mixture of chloroform and petroleum ether, M.P. 190–192°.

By using 1-{4-[2-(4-pyridyl)-ethenyl]-phenyl}-3-{4-[4-(2-pyridyl) - butadienyl] - phenyl} - 2 - thiourea, prepared from 4-[4-(2-pyridyl)-butadienyl]-aniline and 4-[2-(4-pyridyl)-ethenyl]-phenylisothiocyanate, as the starting material in the above reaction a mixture of 2-{4-[2-(4-pyridyl)-ethenyl]-phenyl} - imino - 3 - {4-[4-(2-pyridyl)-butadienyl]-phenyl}-4-methyl-4 - thiazoline hydrochloride and 2-{4-[4-(2-pyridyl)-butadienyl]-phenyl}-imino-3 - {4-[2-(4-pyridyl)-ethenyl]-phenyl}-4-methyl-4-thiazoline hydrochloride can be obtained.

The hydrochloride may be converted to the free base by treatment with aqueous ammonia or sodium hydroxide; the free base can be converted into other salts by treatment with acids, such as those outlined hereinbefore.

What is claimed is:

1. A member of the group consisting of 2-phenyl-imino-3-phenyl-4-lower alkyl-4-thiazoline, in which each of the phenyl radicals is substituted in the 4-position by the group of the formula Py—$(CH=CH)_n$—, in which Py represents a member of the group consisting of 2-pyridyl, 3-pyridyl and 4-pyridyl, and $n$ stands for a whole number from 1 to 2, and therapeutically acceptable acid addition salts thereof.

2. 2-{4-[2-(2-pyridyl)-ethenyl]-phenyl}-imino-3-{4-[2-(2-pyridyl)-etheneyl]-phenyl}-4-methyl-4-thiazoline.

No references cited.